United States Patent
Giampaolo et al.

(10) Patent No.: US 9,208,201 B2
(45) Date of Patent: Dec. 8, 2015

(54) CLOUD STORAGE

(75) Inventors: Dominic B. Giampaolo, Mountain View, CA (US); Dallas De Atley, San Francisco, CA (US); Matthew G. Watson, San Francisco, CA (US); Matthew J. Reda, San Jose, CA (US); Curtis Galloway, Santa Cruz, CA (US); Benjamin Case Trumbull, San Jose, CA (US); Nicholas William Colby Gillett, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 450 days.

(21) Appl. No.: 13/486,385

(22) Filed: Jun. 1, 2012

(65) Prior Publication Data
US 2012/0310880 A1    Dec. 6, 2012

Related U.S. Application Data

(60) Provisional application No. 61/493,390, filed on Jun. 3, 2011.

(51) Int. Cl.
*G06F 7/00* (2006.01)
*G06F 17/30* (2006.01)

(52) U.S. Cl.
CPC .... *G06F 17/30528* (2013.01); *G06F 17/30545* (2013.01)

(58) Field of Classification Search
CPC .............. G06F 17/30528; G06F 17/30545; G06F 2221/0793; G06F 17/30575; G06F 17/30174; G06F 17/30548; G06F 17/30979; G06F 17/30023

USPC ............................ 707/781, 783, 785, 999.002
See application file for complete search history.

(56) References Cited

U.S. PATENT DOCUMENTS

| 6,253,203 | B1 * | 6/2001 | O'Flaherty et al. | |
| 6,985,958 | B2 * | 1/2006 | Lucovsky et al. | 709/230 |
| 7,457,828 | B2 * | 11/2008 | Wenner et al. | |
| 7,877,781 | B2 * | 1/2011 | Lim | 726/1 |
| 8,135,385 | B2 * | 3/2012 | Ohta et al. | 455/411 |
| 8,285,681 | B2 * | 10/2012 | Prahlad et al. | 707/640 |

(Continued)

FOREIGN PATENT DOCUMENTS

| JP | 2005-509979 | 4/2005 |
| JP | 2006-013824 | 1/2006 |

(Continued)

OTHER PUBLICATIONS

Cheung, "Security on cloud computing, query computation and data mining on encrypted database", Technologies Beyone 2020 (TTM), 2011 IEEE Technology Time Machine Symposium on IEEE, Jun. 1, 2011.

(Continued)

*Primary Examiner* — Mohammed R Uddin
(74) *Attorney, Agent, or Firm* — Fish & Richardson P.C.

(57) ABSTRACT

Methods, systems, and apparatus, including computer programs encoded on a computer storage medium, for data storage. In one aspect, a method includes the actions of identifying a running query from an application; determining one or more data items of a plurality of data items that the application has permission to view according to one or more application specific access policies; and presenting the one or more data items to the application while not presenting other data items of the plurality of data items.

34 Claims, 8 Drawing Sheets

(56) References Cited

U.S. PATENT DOCUMENTS

| | | | |
|---|---|---|---|
| 8,327,351 B2* | 12/2012 | Paladino et al. | 717/177 |
| 8,341,127 B1* | 12/2012 | Heithcock et al. | 707/679 |
| 8,407,244 B2* | 3/2013 | Canessa et al. | 707/769 |
| 8,516,137 B2* | 8/2013 | Calder et al. | 709/229 |
| 8,595,382 B2* | 11/2013 | Prophete et al. | 709/248 |
| 8,606,948 B2* | 12/2013 | Evans et al. | 709/230 |
| 8,650,620 B2* | 2/2014 | Chawla et al. | 726/4 |
| 8,762,480 B2* | 6/2014 | Park et al. | 709/216 |
| 2002/0065919 A1* | 5/2002 | Taylor et al. | 709/226 |
| 2002/0133535 A1* | 9/2002 | Lucovsky et al. | 709/201 |
| 2004/0260702 A1* | 12/2004 | Cragun et al. | 707/100 |
| 2005/0050106 A1* | 3/2005 | Wenner et al. | 707/200 |
| 2007/0100834 A1* | 5/2007 | Landry et al. | 707/10 |
| 2007/0124346 A1* | 5/2007 | Mitchel et al. | 707/204 |
| 2007/0130217 A1 | 6/2007 | Linyard et al. | |
| 2007/0203881 A1* | 8/2007 | Schaad et al. | 707/1 |
| 2009/0024589 A1* | 1/2009 | Sood et al. | 707/3 |
| 2009/0221266 A1* | 9/2009 | Ohta et al. | 455/411 |
| 2009/0228509 A1 | 9/2009 | McCarthy et al. | |
| 2009/0260056 A1* | 10/2009 | Garg et al. | 726/1 |
| 2009/0287837 A1* | 11/2009 | Felsher | 709/229 |
| 2010/0184512 A1* | 7/2010 | Evans et al. | 463/31 |
| 2011/0072487 A1 | 3/2011 | Hadar et al. | |
| 2011/0107437 A1* | 5/2011 | Goyal et al. | 726/30 |
| 2011/0247047 A1* | 10/2011 | Loureiro et al. | 726/1 |
| 2012/0005226 A1* | 1/2012 | Canessa et al. | 707/769 |
| 2012/0036141 A1* | 2/2012 | Kim et al. | 707/756 |
| 2012/0143898 A1* | 6/2012 | Bruno et al. | 707/769 |
| 2012/0203932 A1* | 8/2012 | da Costa et al. | 709/248 |
| 2012/0254108 A1* | 10/2012 | Wedewer et al. | 707/618 |
| 2013/0159021 A1* | 6/2013 | Felsher | 705/3 |

FOREIGN PATENT DOCUMENTS

| | | |
|---|---|---|
| JP | 2010-117905 | 5/2010 |
| WO | WO2009/111495 | 9/2009 |
| WO | WO 2010/027653 | 3/2010 |

OTHER PUBLICATIONS

Hengliang et al., "Complex Task Query Based on Cloud Computing Resource: Improved Approximate Skyline Algorithm", Information Science and Engineering (ICISE), 2010 $2^{nd}$ International Conference on, IEEE Dec. 4, 2010.

International Search Report and Written Opinion of the International Searching Authority, PCT Application Serial No. PCT/US2004/033128, Jun. 2, 2005, 16 pages.

MacPeople Basic Mobile Me, Japan, Ascii Media Works, Nov. 29, 2011, MacPeople Jan. 2010, Special Appendix pp. 2-9, 42-63 (English translation provided).

Kukuri Chikusa, UNIX in the palm: The architecture of iPhone, UNIX magazine, Japan, Ascii Media Works Inc., Apr. 1, 2009, vol. 24 #2, No. 246, pp. 113-131 (English translation provided).

* cited by examiner

CLOUD STORAGE

CROSS-REFERENCE TO RELATED APPLICATIONS

This application claims the benefit under 35 U.S.C. §119(e) of the filing date of U.S. Patent Application No. 61/493,390, for Cloud Storage, which was filed on Jun. 3, 2011, and which is incorporated here by reference.

BACKGROUND

This specification relates to data storage.

Users can store data in a remote location, e.g., a network storage location. Users can also transfer data between devices. Typically, users share data with others through file transfer or sharing. For example, a user can identify a particular file to send to others, e.g., by e-mail or using a file transfer protocol. File sharing allows other users, e.g., on a network, to access files, however the files typically remain at their original location. Alternatively, files can be checked out from their original storage location by others, but typically the only user that can modify the file is the one that checked the file out.

SUMMARY

This specification describes technologies relating to data storage and synchronization.

In general, one aspect of the subject matter described in this specification can be embodied in methods that include the actions of identifying a running query from an application; determining one or more data items of a plurality of data items that the application has permission to view according to one or more application specific access policies; and presenting the one or more data items to the application while not presenting other data items of the plurality of data items.

Other embodiments of this aspect include corresponding systems, apparatus, and computer programs recorded on computer storage devices, each configured to perform the operations of the methods.

These and other embodiments can each optionally include one or more of the following features. Determining the one or more data items includes determining whether an identifier associated with each of the plurality of data items matches an identifier associated with the application. The identifier associated with the application uniquely identifies the application. The identifier associated with the application identifies a family of applications having shared access to associated data items. The determining the data items is in response to receiving notification of data items from other devices.

In general, one aspect of the subject matter described in this specification can be embodied in apparatus including one or more computing devices configured to provide: a plurality of applications; a synchronization manager configured to upload data items to a remote storage and to receive data items uploaded to the data storage by other devices; and an access manager configured to determine permission to view data items available to each of the plurality of applications according to one or more application specific access policies.

In general, one aspect of the subject matter described in this specification can be embodied in methods that include the actions of receiving a data item from a device; determining a container for storing the data item, the container being specific to a user account and application associated with the data item; storing the data item in the container; and sending a notification of the data item to one or more other devices associated with the user account. Other embodiments of this aspect include corresponding systems, apparatus, and computer programs recorded on computer storage devices, each configured to perform the operations of the methods.

In general, one aspect of the subject matter described in this specification can be embodied in methods that include the actions of receiving one or more database transaction log files from one or more devices, the database transaction log files each identifying discrete changes made to a database, the database transaction log files being received in place of the database; and notifying each of a plurality of related devices of the transaction log files. Other embodiments of this aspect include corresponding systems, apparatus, and computer programs recorded on computer storage devices, each configured to perform the operations of the methods.

These and other embodiments can each optionally include one or more of the following features. The method further includes storing the transaction log files. The method further includes providing one or more of the transaction log file in response to a request from a device of the plurality of devices.

In general, one aspect of the subject matter described in this specification can be embodied in methods that include the actions of receiving a plurality of transaction logs each identifying discrete changes made to a database; determining that a conflict exists between two or more transaction logs of the plurality of transaction logs; determining whether two or more transactions of the conflicting transaction logs can be merged; if the two or more transactions can be merged, applying the merged transactions to the database; and if the two or more transactions cannot be merged, determining a winning transaction and applying the transaction to the database. Other embodiments of this aspect include corresponding systems, apparatus, and computer programs recorded on computer storage devices, each configured to perform the operations of the methods.

These and other embodiments can each optionally include one or more of the following features. Merging transactions includes determining a common ancestor database and performing a three way merge. The conflict is resolved without user interaction.

Particular embodiments of the subject matter described in this specification can be implemented so as to realize one or more of the following advantages. Data can be securely stored according to application based policies. Applications can only view and read data items from the cloud storage for which permissions have been granted. Access control can be performed at each client device using the application based policies.

Databases can be synchronized using transaction logs without atomically synchronizing the database as a whole between devices. Conflicts between individual database transactions can be resolved at each respective client device using the conflicting transactions and a common ancestor database. System or application vended policies can automatically resolve conflicts between records within a file without user interaction. Client devices can reconstruct the database from scratch using the synchronized material either to bring a new peer device online or resolve issues with the local file.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Techniques for application centric secured storage are described. Data items, for example files, associated with particular applications can be stored in one or more remote locations, e.g., cloud storage, and synchronized with other devices. Each application can only view data items stored at the remote location to which it has permission. An access manager on each client device enforces application specific access policies. Storage at the remote location can be secured for each application associated with a user or user account, for example, using isolated containers.

When an application saves a data item, the data item can be synchronized to the remote storage location. The remote storage location notifies other devices associated with the user of the data item. The access manager on an individual device determines whether or not particular applications are to be notified of the data item based on the access policies for the applications and any particular queries received from those applications. If an application is notified and requests to read the data item, the data item is retrieved from the remote storage.

Techniques for database synchronization are also described. Databases can be synchronized between client devices without atomically moving the entire database to a remote storage location or between peer devices. Transaction log files identify changes to a database relative to a particular baseline state. The transaction log files are synchronized such that when the transactions identified in the transaction log files are applied to the local database, the database becomes synchronized. When a conflict is detected between transaction log files, a determination is made as to whether or not the transactions can be merged and applied to the database. If the transactions cannot be merged, a conflict winner is determined according to particular conflict resolution policies.

Figure 1:
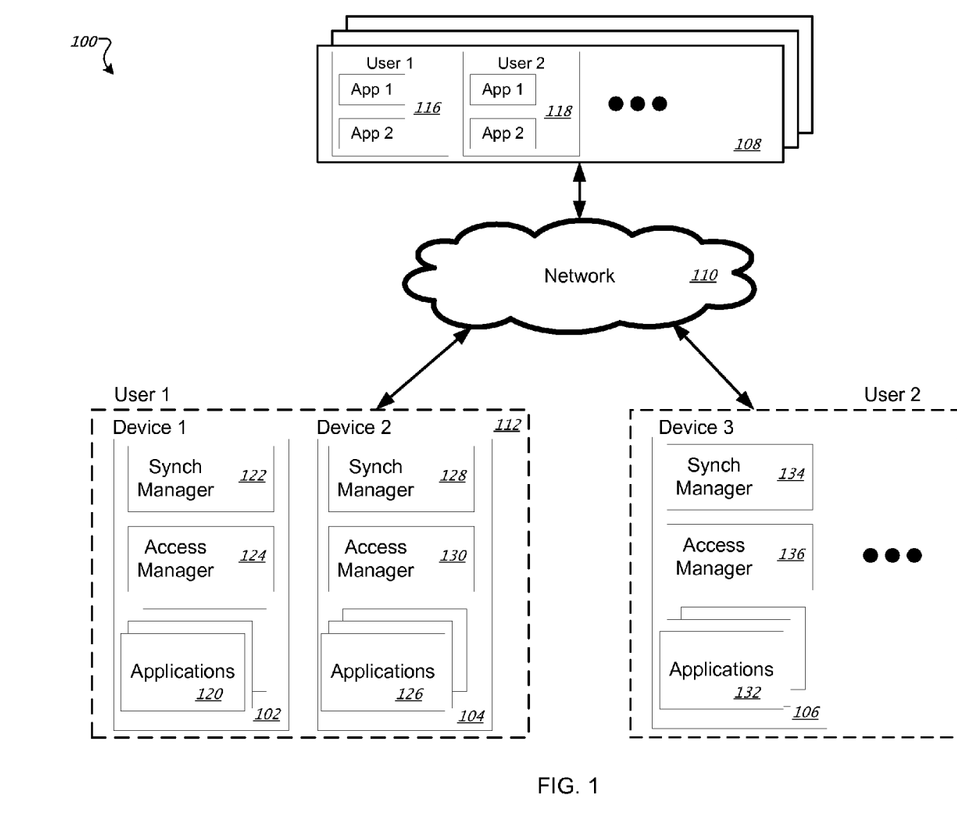
FIG. 1 is a diagram illustrating an example system for securely storing data items.

FIG. 1 is a diagram illustrating an example system 100 for securely storing data items. The system 100 includes a first device 102, a second device 104, a third device 106, and a remote storage location 108.

The first device 102, second device 104, third device 106, and remote storage location 108 are communicatively coupled together using one or more networks 110. The one or more networks 110 can include both wired and wireless networks. The network 110 can be, for example, part of a local area network, wide area network, or the Internet.

The first device 102, the second device 104, and the third device 106 can include, for example, desktop or laptop computing devices, mobile devices, tablet devices, personal data assistants, or other computing devices. In particular, as shown in FIG. 1, each of the devices 102 and 104 are associated with a first user or user account 112. Similarly, the third device 106, and one or more other devices not shown, is associated with a second user or user account 114. The remote storage location 108 can additionally be coupled to many other devices, not shown, that are associated with one or more different users or different user accounts.

The remote storage location 108 can be a single storage location or multiple storage locations. For example, a server, a network addressed storage location, a collection of computing devices, or as part of a cloud storage system presenting virtualized network storage.

The remote storage location 108 includes separate logical containers for storing data from different users/user accounts and application combinations. In some examples, a logical container could be a directory in a file system, or a data structure, or another kind of data organizational unit. For example, the first user/user account 112 can have containers 116 on the remote storage location 108, one for each individual application associated with the user or user account. Similarly the second user/user account 114 can have containers 118 for respective applications. Application data items received from individual devices (e.g., the first device 102) are stored in respective containers for that application. The remote storage location 108 can include a storage manager that creates and manages containers as well as generates notifications for devices associated with users.

The first device 102 includes one or more applications 120, a synchronization manager 122, and an access manager 124. The one or more applications 120 can include various types of applications such as productivity applications, system applications, games, etc. Each application can be associated with a unique key or other identifier that can be used to identify the application and to identify particular access permissions of that application. In some implementations, one or more application 120 is sandboxed such that it is isolated from each other application.

The synchronization manager 122 manages sending data items to the remote storage location 108 and receiving information (e.g., data items or notifications) from the remote storage location 108, as will be described in greater detail below. The access manager 124 presents available data items to particular applications of the applications 120 in response to a query from the respective applications. The access manager 124 applies one or more access policies to determine what data items will be visible to a particular application of the applications 120.

The second device 104 similarly includes one or more applications 126, a synchronization manager 128, and an access manager 130. The applications 120 and application 126 can include one or more of the same applications. The third device 106 similarly includes one or more applications 132, a synchronization manager 134, and an access manager 136. However, the third device 106 is associated with the second user or user account 114.

Figure 2:
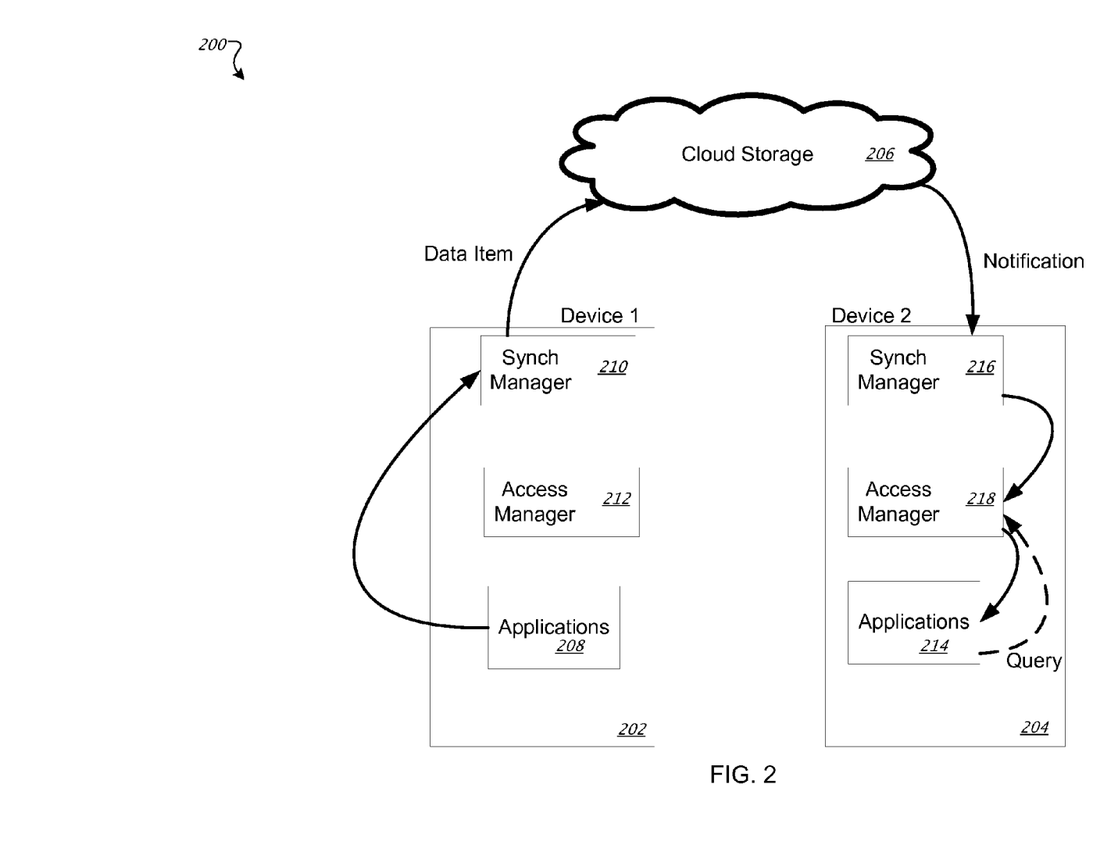
FIG. 2 is a diagram illustrating an example system for synchronizing data items.

FIG. 2 is a diagram illustrating an example system 200 for synchronizing data items between devices. The system 200 includes a first device 202, a second device 204, and a cloud storage 206.

The first device 202 includes applications 208, synchronization manager 210, and access manager 212. Similarly, the second device 204 includes applications 214, synchronization manager 216, and access manager 218. The respective synchronization managers, access managers, and applications can be similar to those described above with respect to FIG. 1.

When a data item is stored by an application of the applications 208 (e.g., by generating a new file or updating an existing file), the synchronization manager 210 detects the data item (e.g., though event notifications provided by a device kernel) and sends the data item to the cloud storage 206. The cloud storage 206 stores the data item in a corresponding application container within the cloud storage 206. The cloud storage 206 also notifies the second device 204 of the data item. The synchronization manager 216 on the second device receives the notification. The synchronization manager 216 notifies the access manager 218, which controls what applications will be able to see the data item of the received notification.

The access manager 218 determines the applications that have permission to read the data item according to one or more access policies. The notification of the data item can include an identifier indicating, for example, the application or applications associated with the data item (e.g., the notification can include a corresponding application key of the application that generated the data item).

The access manager 218 further determines whether there is a query from an application requesting that the application be made aware of new data items. For example, the corresponding application can initiate a running query (e.g., once installed on the second device 204) for new data items associated with the application. If there is a query for the data item, the access manager 218 notifies the corresponding application 214 of the data item. The particular application 214 can view the one or more data items that are available and can request the data item when needed. In particular, the data item does not need to be retrieved from the cloud storage 206 to be presented to the application. Once the application requests read access, the data item can be retrieved or read remotely. The location of the data item can be transparent to the application (e.g., the data item can appear to be located locally when it is located in cloud storage).

Figure 3:
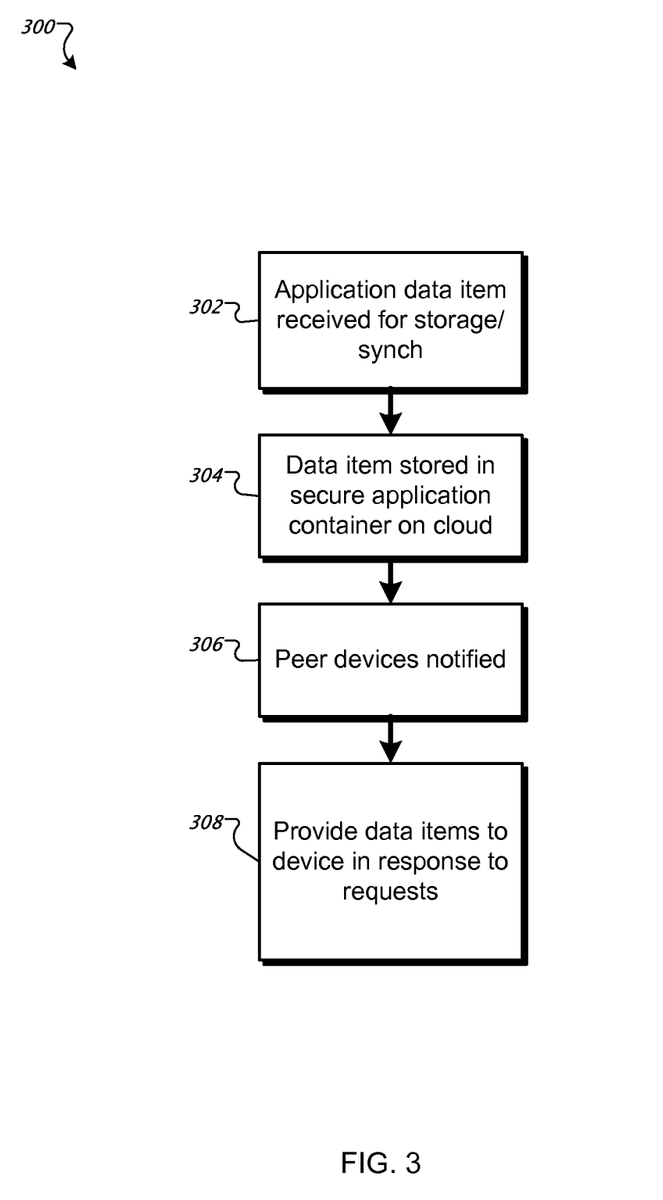
FIG. 3 is a flow chart of an example method for securely storing and synchronizing data items.

FIG. 3 is a flow chart of an example method 300 for securely storing and synchronizing data items. The method 300 can be performed by one or more computing devices, for example, by the devices and remote storage location of FIG. 1.

An application data item is received for storage and/or synchronization (step 302). The application data item can be received in response to the data item being stored locally on a particular device. For example, a given application can save a file to a storage device on a device. The data item can be stored in response to a user action (e.g., a user modification to application data). The data item can be saved as a new file or as a modified version of a previously stored data item. For example, a user of a word processing application can create a new file or modify an existing file. In some implementations, a synchronization manager (e.g., synchronization manager 122) identifies new or changed data items that have been stored. For example, the synchronization manager can monitor file system events to identify data items. In some other implementations, individual applications notify the synchronization manager. The synchronization manager can send the data item to a remote storage location (e.g., remote storage location 108).

Receiving the data item can include receiving the data of the data item as well as additional information or metadata about the data item. The additional information can include information identifying the application associated with the data item (e.g., the application that generated the data item). In some other implementations, the additional information identifies the applications that have permission to access the data item. The identification can include a unique key that identifies a particular application or a group of related applications. For example, a particular application developer can generate multiple related applications (e.g., in a suite of applications by the developer or company) in which data items can be shared.

The data item is stored in a secure application container (step 304). For example, the remote storage location, e.g., cloud storage, can include separate containers for each application associated with a given user or user account. As such, data items for each application and for each user can be separately stored on the remote storage location. Additionally, in some implementations, each container is secured and/or encrypted.

Peer devices are notified (step 306). In order to synchronize the data item across the peer devices, e.g., multiple devices associated with the user or user account, the associated devices are notified of new data items. Devices are associated, for example, through a registration process by the user linking devices to peers. Notifications are sent such that the actual data items do not need to be sent to individual peer devices until requested. In some alternative implementations, however, the data items themselves can be sent to the peer devices in place of notifications.

Once notified, a particular peer device can process the notifications. The processing can include determining whether or not the data item has been previously identified (e.g., as part of an earlier notification of prior data items stored at the remote location). The processing can further include determining the application or applications associated with the data item, e.g., using information or metadata about the data item included in the notification (e.g., including the key identifying the application). Associated applications can be notified of the data item by the respective peer devices.

Data items are provided to devices in response to requests (step 308). For example, a particular application on a device can request read access immediately. Alternatively, the application can store the availability of the data item while leaving it on the remote storage location. The data item can be retrieved when needed, for example, in response to a request to open the data item. For example, a user can request to open the particular data item within the application. The application then requests the data item from the access manager which requests it from the remote storage location.

Figure 4:
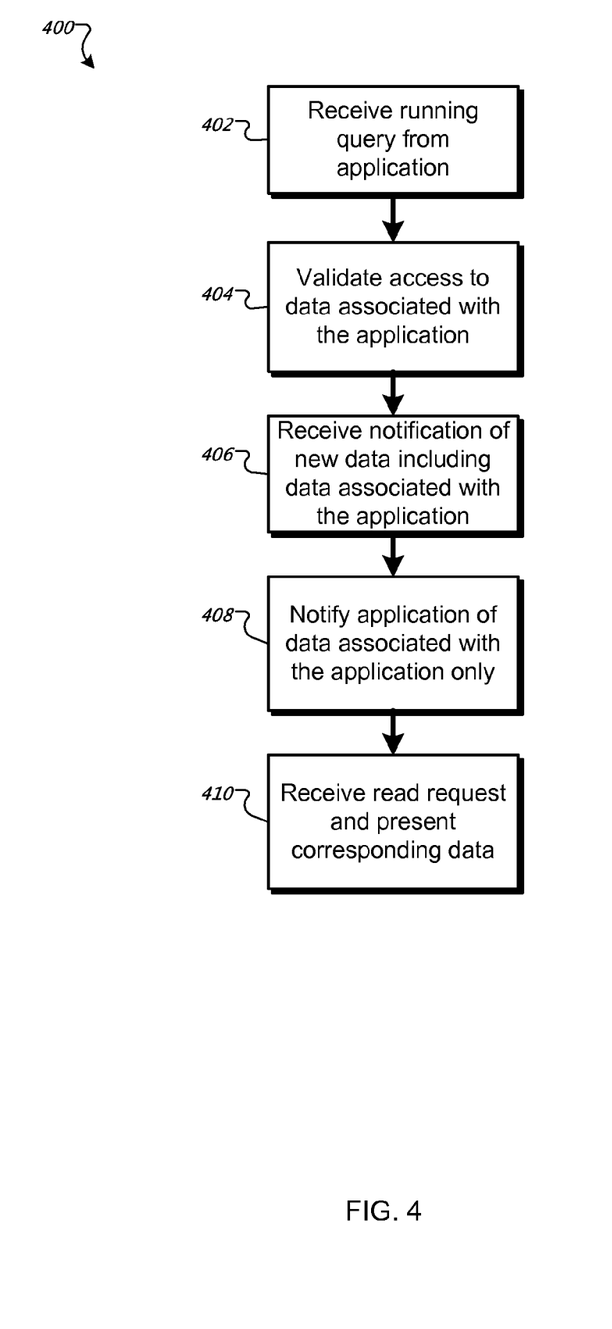
FIG. 4 is a flow chart of an example method for uploading and retrieving application data items.

FIG. 4 is a flow chart of an example method 400 for uploading and retrieving application data items. The method 400 can be performed by one or more computing devices, for example, by the first device 102 of FIG. 1.

A query is received from an application (step 402). The query can be received, for example, when an application is installed or set up for the first time. Alternatively, the query can be received when configuring the application for synchronization with other devices. The query can be a running query that remains pending, and can be responded to, for the life of the application on the device (e.g., until the application is disabled or deleted).

Access to data items associated with the application is validated (step 404). A unique identifier (e.g., a particular application key) can be identified and used to determine what data items or types of data items the application has access to. For example, the application can provide a key that can be matched to particular application access policies.

A notification of new data items including data items associated with the application is received (step 406). A particular peer device notifies an application of the data item (step 310). In particular, an access manager (e.g., access manager 124) can determine which application or applications have permission to access the data item. The permission to access the data item can be determined according to one or more access policies. The access policies can identify permissions for particular applications based on the key or other unique identifier of the application. The identifiers can be validated prior to installation of the application. The information associated with the data item can be compared to the permissions defined by the access policies to determine the applications having access to the data item. In some implementations, only a single application has permission to access data items of the application. In some other implementations, some data items can be shared between particular specified applications.

In some implementations, even if an application has permission to access the data items, the notification is not sent unless there is an application query. For example, the application query can request any new data items. In some implementations, the query is a running query initiated when the application is first installed on the device or first synchronized with other devices.

The application is only notified of data items associated with the application (step 408). The notification to the application only allows the user to view the data items to which the application has access. Thus, for example, if other data items associated with other applications have been received, the application cannot view those data items unless it has the necessary permissions.

A read request is received and the corresponding data is presented (step 410). The application can request read access immediately. Alternatively, the application can store the availability of the data item while leaving it on the remote storage location. The data item can be retrieved when needed, for example, in response to a request to open the data item. For example, a user can request to open the particular data item within the application. The application then requests the data item from the access manager which requests it from the remote storage location.

Figure 5:
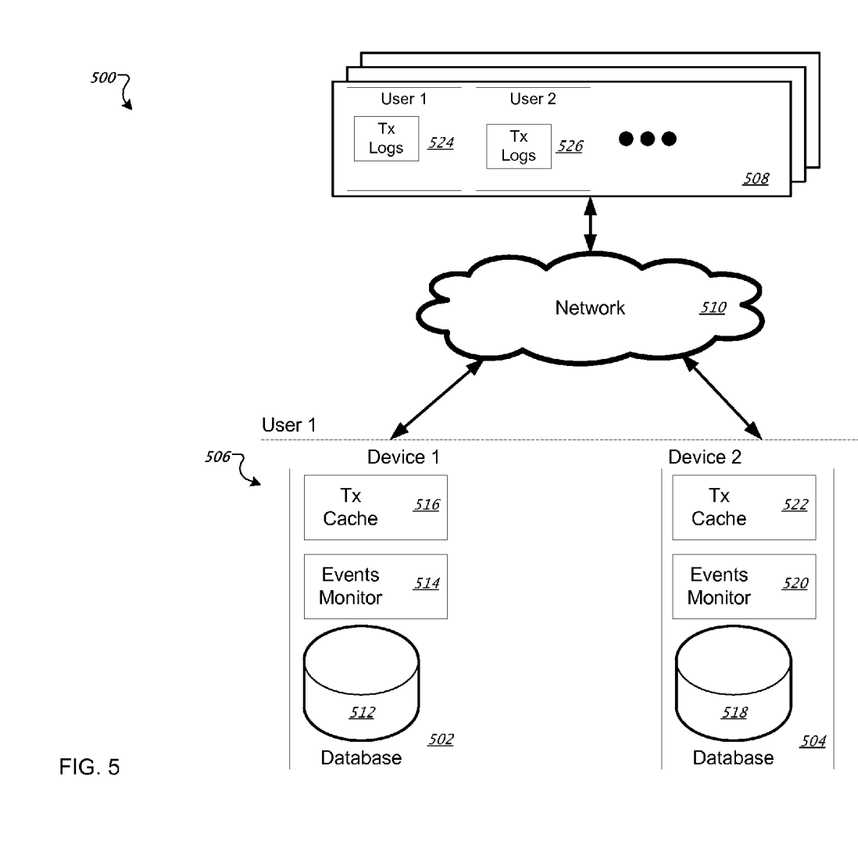
FIG. 5 is a diagram illustrating an example system for storing database transactions.

FIG. 5 is a diagram illustrating an example system 500 for storing database transactions.

The system 500 includes a first device 502 and a second device 504. The first device 502 and the second device 504 are associated with a first user 506. The first device 502 and the second device 504 are coupled to a remote storage location 508 through a network 510.

The first device 502 and the second device 504 can include, for example, desktop or laptop computing devices, mobile devices, tablet devices, personal data assistants, or other computing devices.

The network 510 can be, for example, part of a local area network, wide area network, or the Internet.

The first device 502 includes a database 512, an events monitor 514, and a transaction cache 516. The second device 504 similarly includes a database 518, an events monitor 520, and a transaction cache 522.

When a user makes changes to the database 512, the changes can be detected by the events monitor 514. For example, a user can modify a cell of a database corresponding to a particular row and column. The changes can then be written into the transaction cache 516 as individual transaction logs. The transaction logs can be sent to the remote storage location 508 as received or periodically as part of a batch of one or more transaction files sent periodically according to particular criteria. Similarly, changes to the database 518 can be detected by events monitor 520 and written to transaction logs stored in the transaction cache 522. The transaction logs can be sent to the remote storage location 508

The remote storage location 508 includes separate storage for database information for each user of multiple users including the first user 506. In particular, shown in FIG. 5 are transaction logs 524 for a first user and transaction logs 526 for a second user. The remote storage location 508 can securely store the transaction logs for each user.

Additionally, in some implementations, while database 512 and database 518 are locally stored on the first device 102 and the second device 104, respectively, the corresponding database is not stored in the remote storage location 508. Instead, the transaction logs provided to the remote storage location 508 can be synchronized to each of the first device 502 and the second device 504. Thus, for example, a change to a cell in a large database can be efficiently synchronized without sending the entire large database between devices and the remote storage location.

Within a particular device, transaction logs can be applied to the locally stored database in order to synchronize the database across users. For example, transaction logs from the first device 502 can be synchronized with the second device 504. The transaction logs received at the second device 504 can be applied to the database 518 in order to synchronize the database 518 with the database 512 without transferring the respective databases as a whole.

Figure 6:
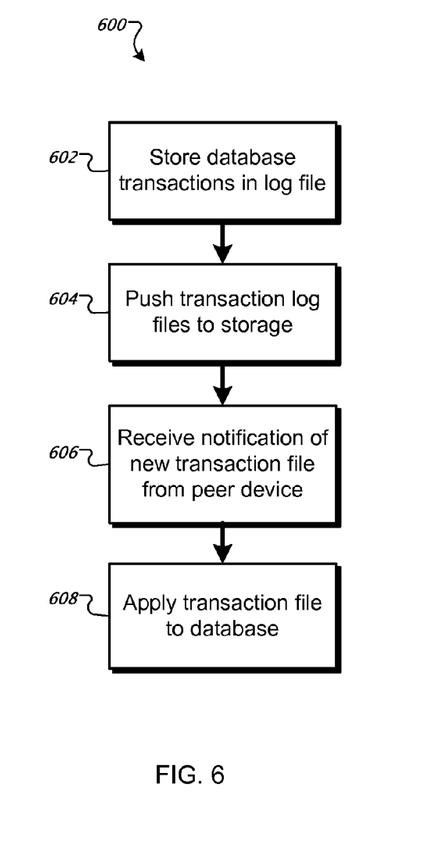
FIG. 6 is a flow chart of an example method for synchronizing a database.

FIG. 6 is a flow chart of an example method 600 for synchronizing a database. The method 600 can be performed by one or more computing devices, for example, by the first device 502 of FIG. 5.

Each database transaction is stored in a transaction log file (step 602). The transaction log file encapsulates the state of the database for a particular transaction such that the transaction can be undone or repeated. The transaction log file provides a single discrete container for a particular database transaction. The transactions can include editing, adding, or deleting rows or columns as a whole as well as individual database cells. A transaction can affect a single cell in isolation or it can be tied to other cells that are related to the content of the edited cell.

The transaction log files also provide a time ordered history of transactions occurring to the database. In some implementations, each transaction log can include a timestamp that indicates when the transaction occurred. In some other implementations, the transaction log files include a change vector. The change vector allows devices reading the transaction log file to determine which other transactions the device that generated the transaction log has previously seen (e.g., whether applied initially at the device or through prior synchronizations) at the time the log was generated. Using the timeline and the transaction log data itself, the transactions can be recreated on another database having a common state to the one in which the transactions occurred.

One or more transaction log files are pushed to a remote storage location (step 604). The transaction log files can be sent individually as they are stored by the database or sent periodically in batches according to particular criteria. For example, individual transaction log files can be stored in a transaction cache (e.g., transaction cache 516). The criteria can include a number of individual transaction log files or a time duration. For example, the criteria can set a threshold number of transaction log files in the cache to trigger an upload to the remote storage location. Similarly, the criteria can specify a period amount of time or time ranges for uploading the transaction log files (e.g., hourly or at night). When the criteria have been satisfied, the transaction log files in the cache can be sent to the remote storage location. The criteria can be combined, for example, a time limit can trigger sending transaction log files even if a specified number of transaction log files have not yet been stored in the cache.

A notification is received of a transaction log file provided to the remote storage location by another device (step 606). In particular, a device (e.g., the first device 502) is notified of transaction log files uploaded by other devices to the remote storage location (e.g., the second device 504). For example, the device can receive a listing of transaction log files. This listing can identify all transaction log files received or all transaction log files from a specified point in time, for example, since the last notification or a common database state. The listing can include transaction log files uploaded by the device. In some implementations, notifications for particular transaction log file are not received in time order. As such the device can wait until all transaction log files are identified.

A change vector can be used to determine whether there are missing transactions. The change vector can include an identifier for each transaction known to the device. In particular, each transaction can have an identifier that identifies the device that created the transaction as well as the particular transaction. The change vector encapsulates the transactions the authoring peer device has seen from the other devices whose logs it has imported. For example, for peer devices A, B, and C, each peer device can maintain its own counter (e.g., transaction #1, transaction #2, etc.). Establishing a global ordering is difficult, so instead the ordering is determined by which transactions any peer has seen at the time it creates a new log. For example, Peer device C might use a change vector of (Peer device C transaction #42, Peer device A transaction #12, Peer device B transaction #101). A timestamp can be included if additional processing is needed, for example, to break ties or confirm that the change vector entries are consistent.

The transactions identified by the translation log file are applied to the database (step 608). The transaction log files provide all of the state information necessary to recreate the transaction given the state following the previous transaction. The current state of the database can be determined. The current state indicates which transaction log file to start applying to the database. For example, the last time the database was modified by applying received transaction log files can establish the state of the database from which new transaction log files can be applied. In some implementations, a baseline database state is periodically established across all related devices such that transactions are applied form the common baseline state.

After the transactions to be applied to the database are identified, the corresponding transaction log files can be requested from the remote storage location. Once retrieved, the transaction log files can be used to replay, in order, each of the transactions on the database.

Figure 7:
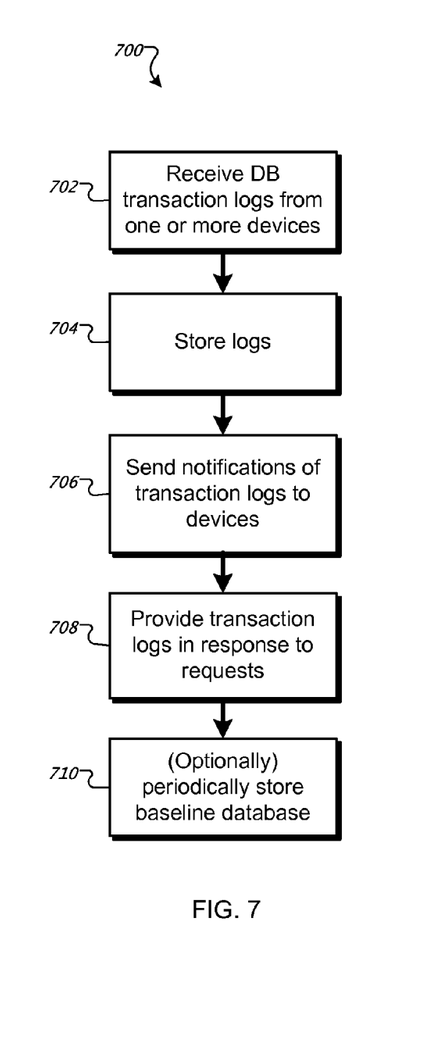
FIG. 7 is a flow chart of an example method for synchronizing a database.

FIG. 7 is a flow chart of an example method 700 for synchronizing a database. The method 700 can be performed by one or more computing devices, for example, by the remote storage location 508 of FIG. 5.

One or more database transaction logs are received from one or more devices (step 702). Transaction log files can be periodically uploaded from various devices. Groups of devices can be associated with a particular user or user account. In some implementations, the database transaction logs are received from many groups of devices associated with respective distinct users or user accounts.

The transaction logs are stored (step 704). The remote storage location can include separate storage locations for each device associated with a particular user or user account. Uploaded transaction log files can be stored to the corresponding location on the remote storage location. In some implementations, this is a subdirectory or container. The combination of all uploaded transaction log files from all associated devices constitutes the remote stored version of the database since the database can be recreated from applying all of the transactions.

Notifications of the transaction logs are sent to the respective one or more devices (step 706). In some implementation, for a given user/user account, periodic notifications are broadcast to each device associated with one or more received transaction logs. The notifications can be sent as each individual transaction log file is received from a peer device or according to a specified schedule. In some implementations, the notifications provide a running list of all transaction log files received for the database. In some other implementations, the notifications provide a list of transaction log files received after a particular point in time. The point in time may be based on the last notifications sent to the device or a last established baseline database.

One or more transaction log files are provided to a device in response to a request (step 708). Individual devices can request one or more of the transaction log files in response to the received notifications.

A baseline database is optionally stored periodically (step 710). In particular, in some implementations, a baseline database state is periodically established. This database can be stored, e.g., on the remote storage location. Transaction log files can then be maintained and notifications sent relative to this baseline database. Alternatively, in some other implementations, only a running collection of received transaction log files is maintained.

Figure 8:
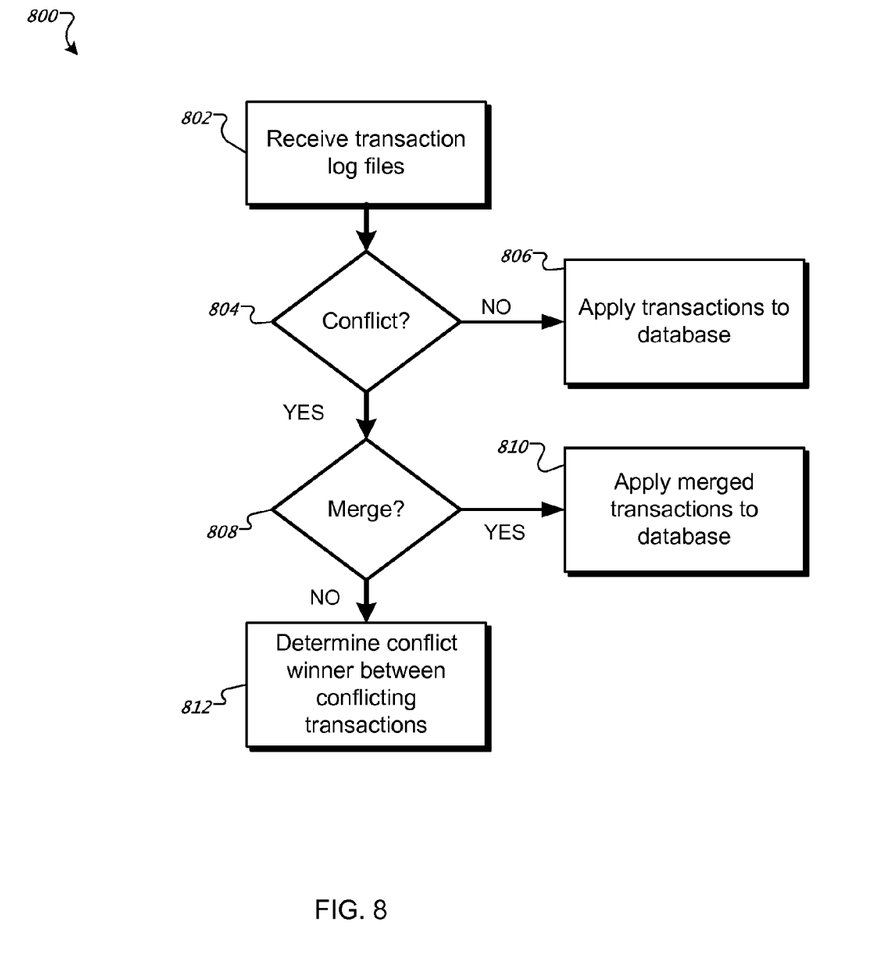
FIG. 8 is a flow chart of an example method for managing conflicts.

FIG. 8 is a flow chart of an example method 800 for managing conflicts. The method 800 can be performed by one or more computing devices, for example, by the first device 502 or the second device 504 of FIG. 5.

Transaction logs are received (step 802). In particular, transaction log files can be received from two or more different devices. A determination is made as to whether there is a conflict (step 804). The determination of a conflict can be made based on the comparison of transaction log files. The comparison can be used to determine the nature of the changes applied to the database by each transaction. For example, if there is a change of a column name in a first transaction on a first device and another change to the same column name in a second transaction from a different device, a conflict can occur. In some implementations, two transactions changing a same row of the database is considered a conflict.

In some alternative implementations, metadata about the contents of the transaction log files can be cached. This can increase the speed of conflict detection. For example, the metadata can identify the rows changed by the transaction so that conflicting transaction logs can quickly be identified.

If there are no conflicts, the transactions are applied to the database (step 806). Once the transactions are applied, the database can have a state corresponding to the sum of the transactions as applied to the baseline database.

If there are conflicts, a determination is made as to whether or not the conflicting transactions can be merged (step 808). For example, two or more transactions can make changes to the same row of the database. However, if the individual cells are not dependent upon each other and the changes to the row occur in different columns, then each of the transactions can be separately applied. By contrast, two transactions to the same cell of the database may not be merged together because the changes contradict each other.

In some implementations, transactions that have a conflict where the same cell has been changed twice can be resolved to prefer the more recent change (e.g., using the change vector and timestamp), while simultaneously minimizing the amount of data trumped outright by the more recent changes. In this way sophisticated merges can be performed without user intervention or application developer effort.

This conflict minimization can be performed per column, as well as with respect to join table entries (to-many relationships' contents). As an example the database can include identities of Person membership in a Group). Multiple peer devices can edit the Group membership, for example by adding and removing members. Different devices adding or removing different Person members do not create a conflict. A conflict only arises if the same Person is added or deleted differently between the different devices. The determination of which membership changes are additions or deletions is done with respect to the common ancestor of the devices. This is a "three way merge" (e.g. device #1, device #2, and the common ancestor as the last database state that the devices previously agreed upon, as described in more detail below).

In some implementations, to determine whether or not a merge can occur, a comparison is made between the conflicting transactions and a common ancestor database state. The comparison is used to determine whether application of both transactions can be performed without creating other conflicts within the database that cannot be merged.

A common ancestor database can be identified using one or more factors. The factors can include an identification of the first peer device to be connected to the remote storage location, the slowest peer device (e.g., to identify a common database state reached by all peer devices), and declaring a peer as dead due to inactivity. The common ancestor state is determined using the change vector and timestamp of the logs to trace back far enough in the transactions that the peer devices with conflicts reach a previously agreed upon state of the database. The baseline database could be the farthest back for all peers, but any two peer devices might only be off by a few transaction logs. They would examine the logs in reverse order to get to the state prior to the first unresolved conflict between them. Also, in some implementations, conflict resolution is not limited to two peers. It's possible that three or more peers find themselves in conflict.

If the conflicting transactions can be merged, the merged transactions are applied to the database (step 810). Once the transactions are applied, the database can have a state corresponding to the sum of the transactions as applied to the baseline database.

If the conflicting transactions cannot be merged, conflict winner is determined between the conflicting transactions (step 812). In some implementations, the conflict winner is determined based on timestamps associated with each transaction. For example, each transaction log file can include a timestamp indicating the time at which the transaction occurred on the respective device. The conflict winner can be chosen as the most recent change of the conflicting transactions. Other heuristics can be used to determine the conflict winner. Rules can establish an order of precedence for particular types of transactions. For example, a deletion can win over a different kind of change. The transaction of the conflict winner can be applied to the database while the transaction of the conflict loser can be discarded.

In some implementations, merge policies for particular database structures can be defined by the database developer or by a user. A user interface can be presented for inputting or modifying merge policies.

In some implementations, a peer database can be restored from a damaged state using the stored transaction log files on the remote storage location. Similarly, the stored transaction log files on the remote storage location can be used to bring a database from a new user device added to the remote storage location up to date.

In some implementations, the identified conflict results from an "ABA" problem. The ABA problem is when, even though a column's value appears to be unchanged from the common ancestor (e.g. A), in fact, it has been changed twice (from A to B and back to A). Detecting this allows the conflicts can be resolved to prefer the most recent change. So in this case, A appears the same as the common ancestor, but could still be more recent that a new value from another device.

Figure 9:
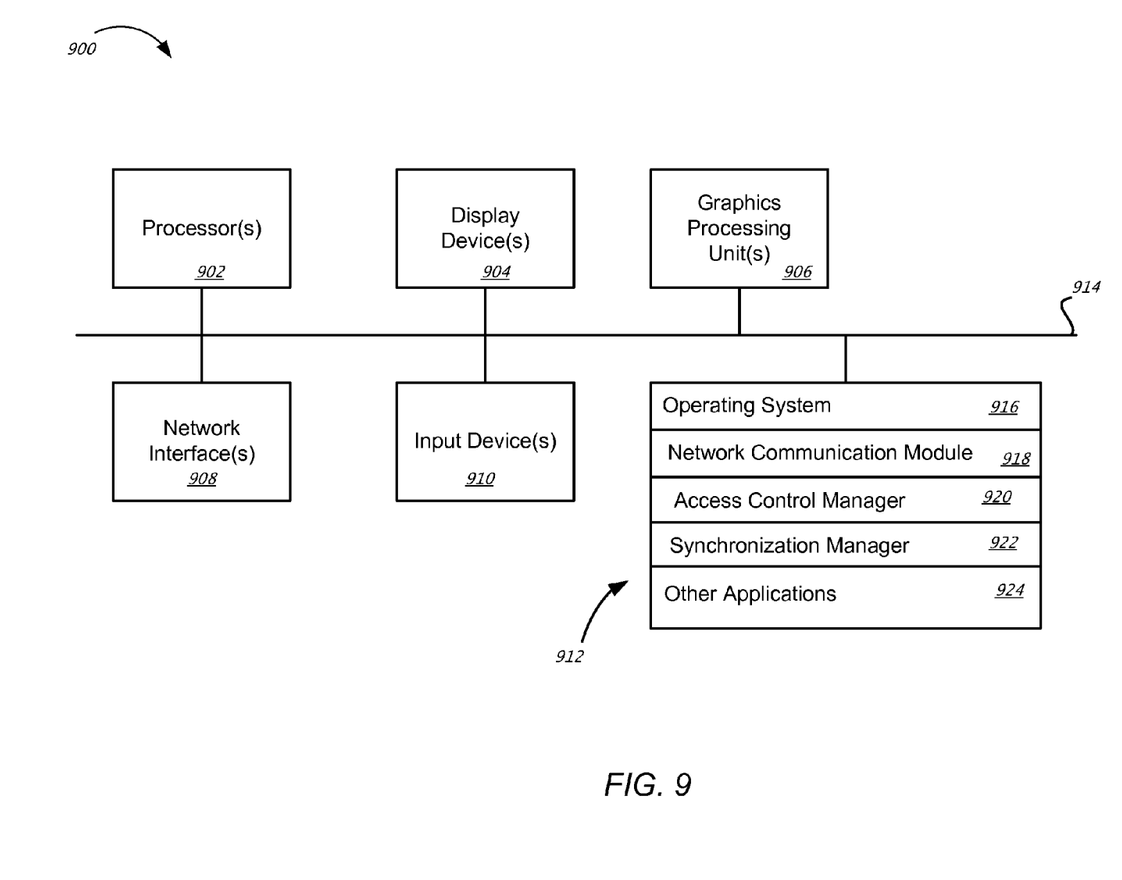
FIG. 9 is an example system architecture.

FIG. 9 is an example system architecture 900 for a computer system. The system architecture 900 is capable of performing operations described herein. The architecture 900 includes one or more processors 902 (e.g., IBM PowerPC, Intel Pentium 4, etc.), one or more display devices 904 (e.g., CRT, LCD), graphics processing units 906 (e.g., NVIDIA GeForce, etc.), a network interface 908 (e.g., Ethernet, FireWire, USB, etc.), input devices 910 (e.g., keyboard, mouse, etc.), and one or more computer-readable mediums 912. These components exchange communications and data using one or more buses 914 (e.g., EISA, PCI, PCI Express, etc.).

The term "computer-readable medium" refers to any tangible medium that participates in providing instructions to a processor 902 for execution. The computer-readable medium 912 further includes an operating system 916 (e.g., Mac OS®, Windows®, Linux, etc.), a network communication module 918, an access control manager 920, a synchronization manager 922, and other applications 924.

The operating system 916 can be multi-user, multiprocessing, multitasking, multithreading, real-time and the like. The operating system 916 performs basic tasks, including but not limited to: recognizing input from input devices 910; sending output to display devices 904; keeping track of files and directories on computer-readable mediums 912 (e.g., memory or a storage device); controlling peripheral devices (e.g., disk drives, printers, etc.); and managing traffic on the one or more buses 914. The network communications module 918 includes various components for establishing and maintaining network connections (e.g., software for implementing communication protocols, such as TCP/IP, HTTP, Ethernet, etc.).

The access control manager 920 and synchronization manager 922 provide various software components for performing the various functions for performing application specific access control and synchronization of data items including database transactions between devices as described with respect to FIGS. 1-8.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   on a first computing device associated with a user account, receiving a running query from an application running on the first computing device;
   receiving a notification that data items satisfying the running query are available at a remote storage location, the notification including an identifier that can be used to identify a corresponding application that created the respective data item and to identify particular access permissions of that application, and the data items satisfying the running query having been contributed by a second computing device associated with the user account;
   based on the notification, determining that the application has permission to access a first data item of the data items satisfying the running query, according to one or more application specific access policies;
   determining that the application does not have permission to access a second data item of the data items satisfying the running query;
   presenting the first data item satisfying the running query to the application; and
   withholding presentation of the second data item to the application.

2. The method of claim 1, comprising
   transmitting, to the remote storage location, a request to receive the first data item; and
   receiving the first data item from the remote storage location.

3. The method of claim 1, wherein the running query remains active until the application has been disabled or deleted.

4. The method of claim 1, wherein determining that the application has permission to access the first data item includes determining whether an identifier associated with the first data item matches an identifier associated with the application.

5. The method of claim 4, wherein the identifier associated with the application identifies a family of applications having shared access to data items associated with the identifier.

6. The method of claim 4, wherein the notification that the data items satisfying the running query are available at a remote storage location includes data representing the identifier associated with the first data item that matches the identifier associated with the application.

7. The method of claim 1, wherein the notification is received from another computing device associated with the user account.

8. The method of claim 1 comprising determining that the data items satisfy the running query based on data of the received notification.

9. The method of claim 1, wherein the notification includes a corresponding application key of the application that generated the respective data item.

10. The method of claim 1 comprising granting access to the first data item based on the data identifying the application that generated the first data item.

11. A method comprising:
    receiving a data item from a first computing device associated with a user account, the data item associated with an application running on the first computing device;
    determining a container for storing the data item, the container being specific to the user account associated with the first computing device, and specific to the application;
    storing the data item in the container; and
    sending a notification of the data item to one or more other devices associated with the user account, the notification including an identifier that can be used to identify a corresponding application that created the respective data item and to identify particular access permissions of that application.

12. The method of claim 11, wherein the notification includes a corresponding application key of the application that generated the data item.

13. A system comprising:
    a first computing device associated with a user account and configured to:
       receive a running query from an application running on the first computing device;
       receive a notification that data items satisfying the running query are available at a remote storage location, the data items satisfying the running query having been contributed by a second computing device associated with the user account;
       based on the notification, determine that the application has permission to access a first data item of the data items satisfying the running query, according to one or more application specific access policies;
       determine that the application does not have permission to access a second data item of the data items satisfying the running query;
       present the first data item satisfying the running query to the application; and
       withhold presentation of the second data item to the application; and
    a server system configured to:
       receive a data item from the first computing device, the data item associated with the application running on the first computing device,
       store the data item, and send a notification of the data item to one or more other devices associated with the user account, the notification including an identifier that can be used to identify a corresponding application that created the respective data item and to identify particular access permissions of that application.

14. The system of claim 13, the first computing device being further configured to transmit, to the remote storage location, a request to receive the first data item; and
receive the first data item from the remote storage location.

15. The system of claim 13, wherein the running query remains active until the application has been disabled or deleted.

16. The system of claim 13, wherein determining that the application has permission to access the first data item includes determining whether an identifier associated with the first data item matches an identifier associated with the application.

17. The system of claim 16, wherein the identifier associated with the application identifies a family of applications having shared access to data items associated with the identifier.

18. The system of claim 13, wherein the notification is received from another computing device associated with the user account.

19. A computer program product, stored on a non-transitory computer readable medium, comprising instructions that when executed on a first computing device cause the first computing device to perform operations comprising:
receiving a running query from an application running on the first computing device;
receiving a notification that data items satisfying the running query are available at a remote storage location, the notification including an identifier that can be used to identify a corresponding application that created the respective data item and to identify particular access permissions of that application, and the data items satisfying the running query having been contributed by a second computing device associated with the user account;
based on the notification, determining that the application has permission to access a first data item of the data items satisfying the running query, according to one or more application specific access policies;
determining that the application does not have permission to access a second data item of the data items satisfying the running query;
presenting the first data item satisfying the running query to the application; and
withholding presentation of the second data item to the application.

20. The computer program product of claim 19, the operations comprising transmitting, to the remote storage location, a request to receive the first data item;
and
receiving the first data item from the remote storage location.

21. The computer program product of claim 19, wherein the running query remains active until the application has been disabled or deleted.

22. The computer program product of claim 19, wherein determining that the application has permission to access the first data item includes determining whether an identifier associated with the first data item matches an identifier associated with the application.

23. The computer program product of claim 22, wherein the identifier associated with the application identifies a family of applications having shared access to data items associated with the identifier.

24. The computer program product of claim 19, wherein determining the data items is in response to receiving a notification of a data item from another computing device associated with the user account.

25. A computer program product, stored on a non-transitory computer readable medium, comprising instructions that when executed on a first computing device cause the first computing device to perform operations comprising:
receiving a data item from a first computing device associated with a user account, the data item associated with an application running on the first computing device;
determining a container for storing the data item, the container being specific to the user account associated with the first computing device, and specific to the application;
storing the data item in the container; and
sending a notification of the data item to one or more other devices associated with the user account, the notification including an identifier that can be used to identify a corresponding application that created the respective data item and to identify particular access permissions of that application.

26. The computer program product of claim 25, wherein the notification includes a corresponding application key of the application that generated the data item.

27. A system comprising:
a first computing device associated with a user account and configured to:
on a first computing device associated with a user account, receiving a running query from an application running on the first computing device;
receiving a notification that data items satisfying the running query are available at a remote storage location, the notification including an identifier that can be used to identify a corresponding application that created the respective data item and to identify particular access permissions of that application, and the data items satisfying the running query having been contributed by a second computing device associated with the user account;
based on the notification, determining that the application has permission to access a first data item of the data items satisfying the running query, according to one or more application specific access policies;
determining that the application does not have permission to access a second data item of the data items satisfying the running query;
presenting the first data item satisfying the running query to the application; and
withholding presentation of the second data item to the application.

28. The system of claim 27, the first computing device being further configured to transmit, to the remote storage location, a request to receive the first data item; and
receive the first data item from the remote storage location.

29. The system of claim 27, wherein the running query remains active until the application has been disabled or deleted.

30. The system of claim 27, wherein determining that the application has permission to access the first data item includes determining whether an identifier associated with the first data item matches an identifier associated with the application.

31. The system of claim 30, wherein the identifier associated with the application identifies a family of applications having shared access to data items associated with the identifier.

32. The system of claim 27, wherein the notification is received from another computing device associated with the user account.

33. A system comprising:
a server system configured to:
receive a data item from a first computing device associated with a user account, the data item associated with an application running on the first computing device,
determine a container for storing the data item, the container being specific to the user account associated with the first computing device, and specific to the application,
store the data item in the container, and
send a notification of the data item to one or more other devices associated with the user account, the notification including an identifier that can be used to identify a corresponding application that created the respective data item and to identify particular access permissions of that application.

34. The system of claim 33, wherein the notification includes a corresponding application key of the application that generated the data item.

\* \* \* \* \*